March 27, 1928.

J. B. BARTHOLOMEW

ROAD SCRAPER

Filed July 9, 1921

J. B. BARTHOLOMEW

ROAD SCRAPER

Filed July 9, 1921

Inventor
John B. Bartholomew
BY
Attorney

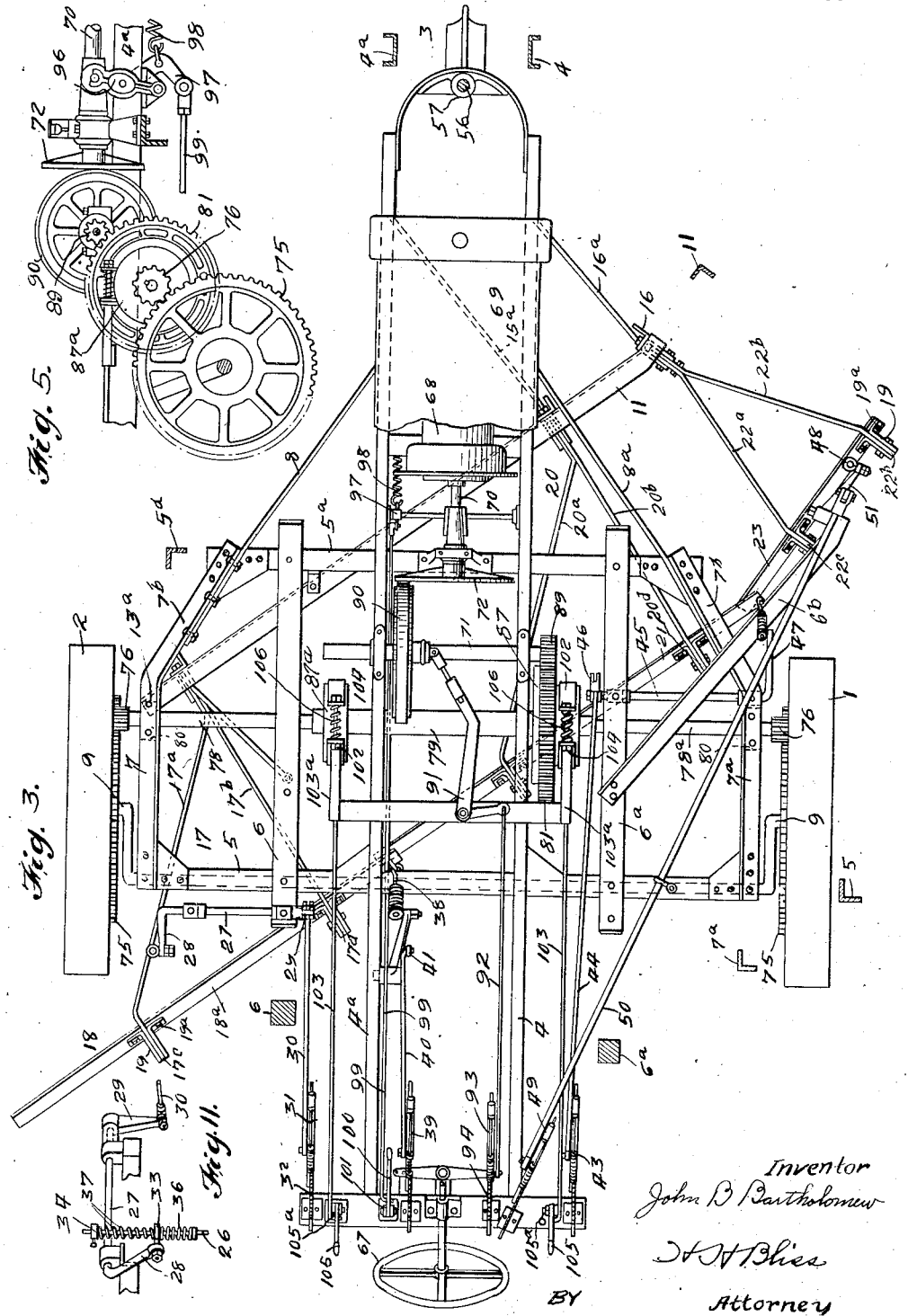

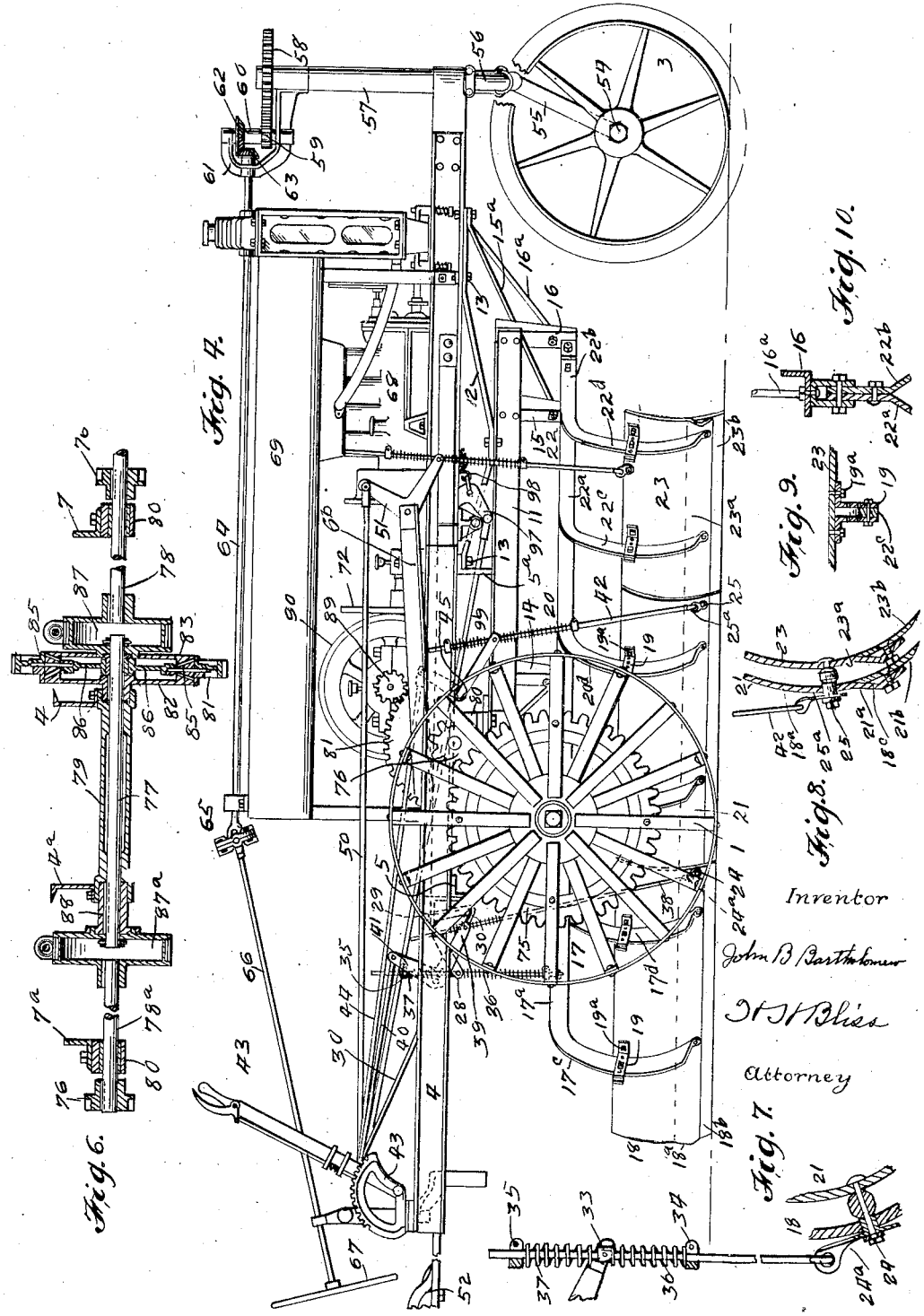

Patented Mar. 27, 1928.

1,663,581

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

ROAD SCRAPER.

Application filed July 9, 1921. Serial No. 483,478.

This invention relates to improvements in road scrapers. The objects are to provide an automotive scraper which will be simpler, more durable and readily manipulated than the mechanisms for this purpose heretofore proposed.

Fig. 3 is a plan view indicating more completely the entirety of the mechanism.

Fig. 4 is a side elevation showing the apparatus complete.

Fig. 5 is a side view of some of the transmission gearing detached.

Fig. 6 is a longitudinal section of the main counter shaft.

Figure 7 is a detail sectional view through the joint between the intermediate and left end sections of the scraper;

Figure 8 is a view similar to Figure 7 through the joint between the intermediate and right hand sections of the scraper;

Figure 9 is a detail section through the connection between one of the scraper sections and a suspension yoke bar;

Figure 10 is a detail section of the connection between the forward end of a scraper suspension yoke and the main frame;

Figure 11 is a detail of the upper portion of the suspension means of the scraper;

Figure 12 is a detail view of the driver's seat.

Figure 1:
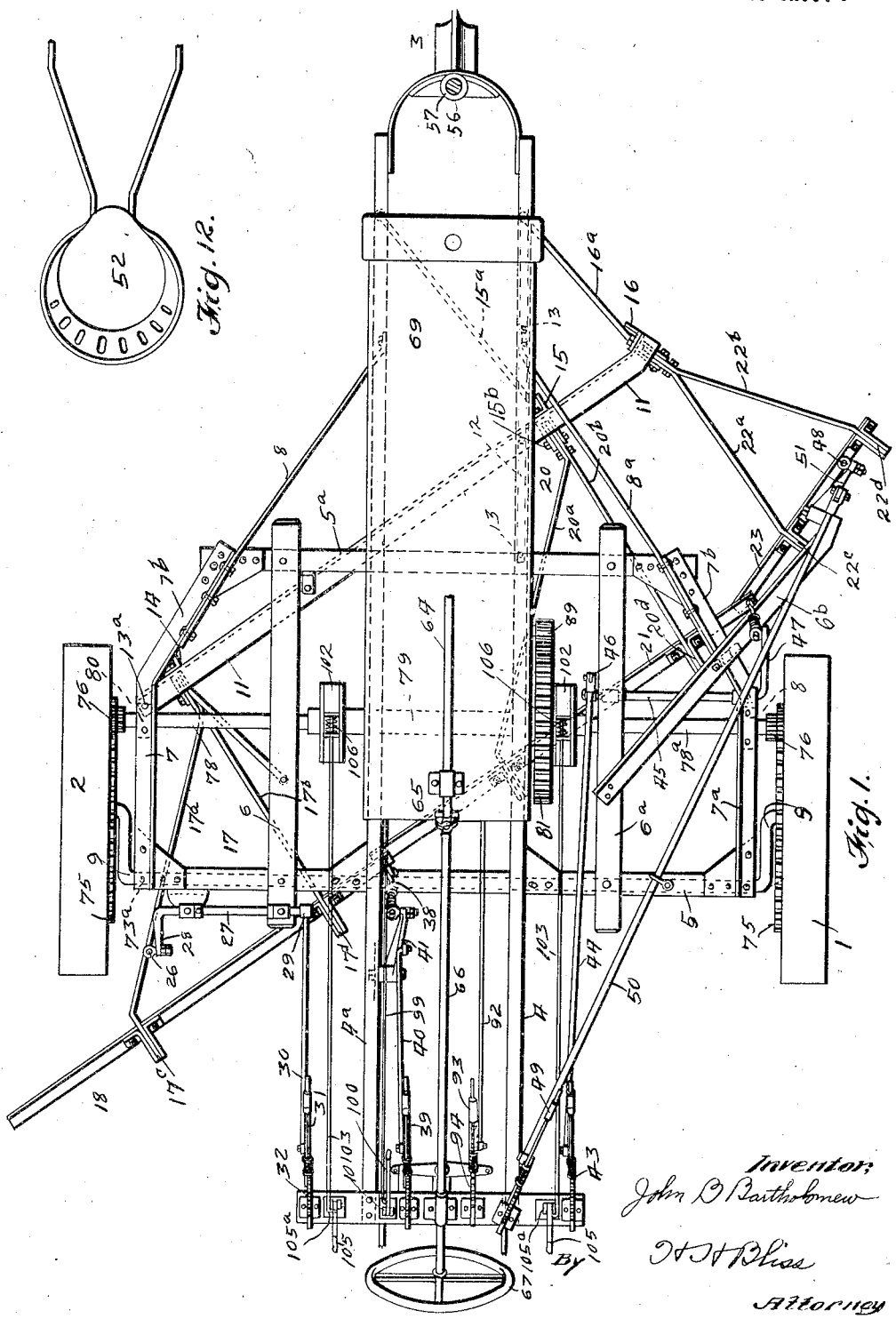
Fig. 1 is a plan view showing the relation of the various parts of the framework of the traction and steering mechanism and of the earth-engaging blades, the engine and much of the power transmitting and controlling apparatus being removed.
Figure 2:
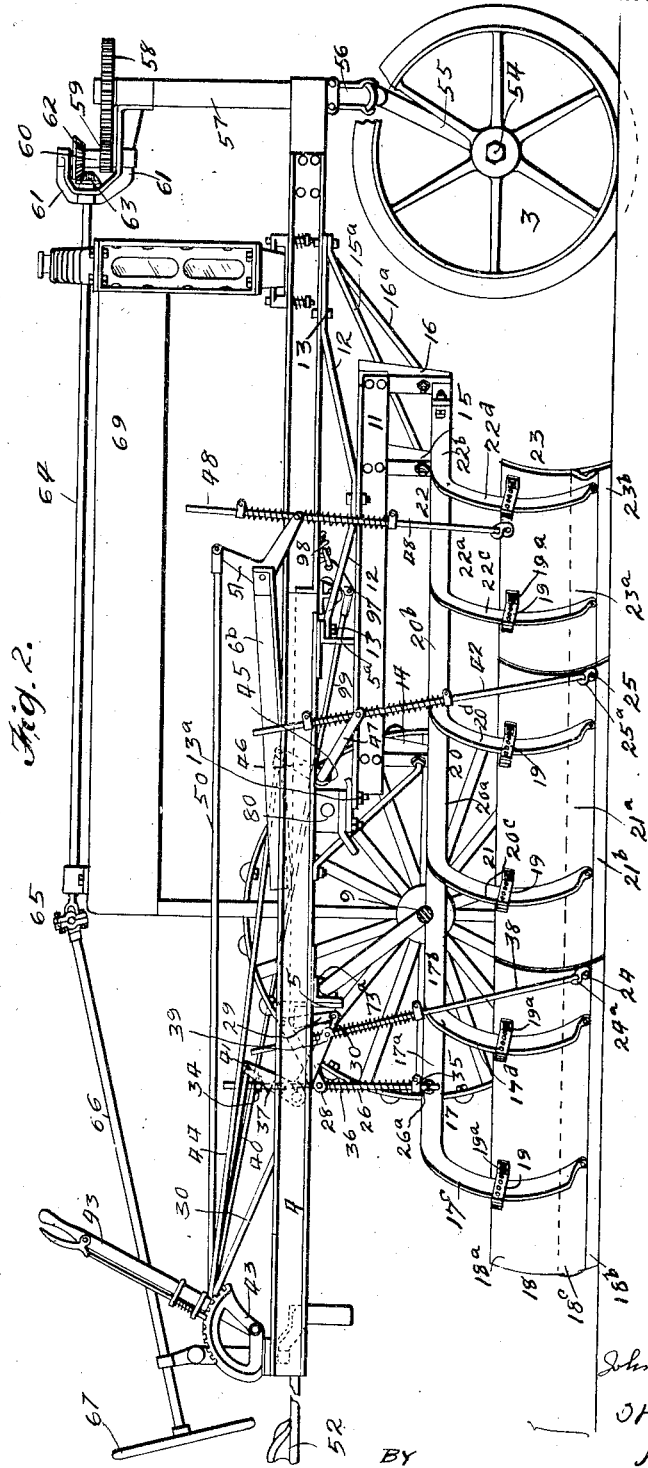
Fig. 2 is a side elevation of the parts shown in Fig. 1.

The framework is mounted upon the traction wheels 1, 2 and a steering wheel 3. This framework comprises the elongated longitudinally positioned bars 4, 4ª, extending throughout almost the entire length of the apparatus. Transversely of these bars are arranged the elongated cross bars 5, 5ª, the latter being somewhat shorter than that at 5. 6, 6ª are longitudinally arranged bars rigidly secured to those at 5, 5ª, and on lines somewhat outside the lines of the main sills 4, 4ª.

The bars 5, 5ª are also connected at their ends by bars 7, 7ª, each of which has its forward end portion turned inward, as shown at 7ᵇ. From the in-turned or inclined parts 7ᵇ extension bars 8, 8ª are carried forward and securely fastened to the front part of the sills 4, 4ª.

The main frame having the elements just described is positioned in horizontal planes considerably above the axes of the wheels 1, 2, the spindles at 9, 9 of the latter being carried by sections that extend up to and are secured to the main frame. 11 is a transversely arranged draft bar. It is positioned on horizontal lines immediately below the bars 5ª and 7, and is firmly fastened in place by brace bars 12 and by bolts 13, 13ª. 14, 15 and 16 indicate short posts or standards extending down from the draft bar 11, the first being in vertical longitudinal planes near those of the ground wheel 2, and the others being near the planes of the wheel 1. They are respectively braced to the main frame by brace rods as indicated at 15ª and 16ª. 17 indicates a double drag bar, having the two legs 17ª, 17ᵇ rigidly connected together at their forward ends and pivotally connected to the post or standard 14. The legs 17ª, 17ᵇ diverge rearwardly and terminate in down curved standards 17ᶜ, 17ᵈ.

18 is a concavo-convex scraper bar. It is composed of an upper part 18ª and a lower shear-like part 18ᵇ, detachably secured by bolts to the lower edge portion of the part 18ª, the latter overlapping the shear as shown at 18ᶜ. The standards 17ᶜ and 17ᵈ are secured to this overlapping part 18ᶜ of the body of the blade. 19 represents perforated clips rigidly secured at 19ª to the rear surface of the section 18ª of the blade and permitting the blade to be adjusted with respect to its inclination to the horizontal.

20 indicates a second double drag bar composed of the two bars 20ª and 20ᵇ, held rigidly together at their front ends and pivotally connected at 15ᵇ to the post 15. These bars or arms 20ª, 20ᵇ diverge rearward and terminate in down curved standards 20ᶜ, 20ᵈ. 21 represents a second scraper having the body part 21ª and the shear part 21ᵇ. The standards 20ᶜ, 20ᵈ are fastened at their lower ends to the rear surface of the lower portion of the scraper body 21ª, and they are adjustably secured at points near the upper part by adjusting clips 19. 22 indicates a third bifurcated drag bar having arms 22ª and 22ᵇ, brought together at their front ends and pivotally connected to the post 16. Their rear ends diverge and terminate in downward curved standards 22ᶜ, 22ᵈ. 23 indicates a third scraper element having the body part 23ᵃ and the shear at 23ᵇ. The standards 22ᶜ and 22ᵈ are secured to this scraper section in the way above described.

The scraper element 21 at its lefthand end overlaps the righthand end of the section 18. They are secured together by a horizontal pivot at 24 (see Figure 7). And the section 23 of the scraper is joined to that at 21 by a horizontal pivot at 25 (see Figure 8).

The suspension adjusting and lifting devices for the scraper sections are the following:

26 is a vertical rod pivotally connected at 26ᵃ to the arm 17ᵃ of the drag 17. This rod 26 is suspended from a bell crank on a rock shaft 27 having the crank arm 28 and the crank arm 29. 30 is a link connecting the crank arm 29 with a hand lever 31 pivoted on the frame and adjustably locked by a detent and toothed rack at 32.

The crank arm 28 is not rigidly connected to the suspension rod 26; the crank arm is pivotally connected to a collar 33, loosely surrounding rod 26. Between this collar and collars 34 and 35, tightly secured to the rod 26, are springs 36 and 37. The loose collar 33 connects the drag bar and scraper section 18 yieldingly when the lever 31 is drawn back, and the spring 36 can be utilized to exert yielding pressure on the scraper when lever 31 is moved forward.

38 is a suspension rod which at the lower end is pivotally connected to a bracket at 24ᵃ, which carries the pivot 24 that joins the two scraper sections 18 and 21. Rod 38 is connected yieldingly to a manual lifting and adjusting lever 39 through a link 40 and a bell crank lever 41, by springs and connecting devices similar to those above described.

42 is a suspension rod pivotally connected to the bracket 25ᵃ, which supports the pivot 25 that joins the scraper sections 21 and 23. This rod is connected to a set of manual lifting and adjusting parts comprising the lever 43, link 44, rock shaft 45 and crank arms 46 and 47, the latter having a loose collar which co-acts with upper and lower springs and collars on the rod 42 in the manner already described.

48 is a suspension rod pivotally connected to the upper part of the scraper section 23. This rod is also connected to a manual control system comprising the hand lever 49, the link 50 and the bell lever 51, the lower arm of which carries a loose collar on the rod 48, with springs and fixed collars above and below it. The bell lever 51 is fulcrumed on a frame bar 6ᵇ that extends diagonally outward from frame bar 6ᵃ and passes across bar 7ᵇ.

It will be seen that peculiar control of the scraper sections is provided for. They can be held approximately rigidly in line, and at the same time will yield at their ends when necessary. The overlapping ends of two adjacent sections can rise or fall together, and provision is made for their conforming to surfaces of widely different conformation.

The driver in his seat at 52 can readily reach the several controlling devices and quickly modify the positions of the scraper sections as demanded.

The scraper, as an entirety, extends across the machine on lines intersecting the vertical plane of the axes of the wheels, the righthand portion of the scraper extending laterally outward in front of the righthand traction wheel, and the lefthand part extending outward on lines behind the lefthand traction wheel. This is an arrangement I have found greatly superior to that which has been commonly employed, this element of the mechanism ordinarily being positioned entirely in front of both wheels and having two truck wheels in front.

I have reduced the framework to the simple construction shown, and so distribute the load on the scraper upon the two main wheels that I can employ a single simple steering wheel at 3 under the front end of the frame. This wheel at 3 has normally a castering action, its spindle 54 being held by a carrier 55 which inclines backward from the central vertical spindle part 56. The latter is mounted in a bearing bracket 57 and at its upper end has a steering gear wheel 58. With the latter engages a pinion 59 mounted on a short countershaft 60 mounted in bracket arms 61. The shaft 60 also has a bevel wheel 62, with which meshes the bevel pinion 63. This pinion is on the forward end of a shaft 64, which extends backward over the engine and is joined by a universal coupling at 65 to a shaft 66 which inclines downward to a hand wheel 67 within immediate reach of the driver.

The machine is propelled by the following devices. 68 indicates a gasoline engine or motor, as an entirety, secured to the forward part of the central extension of the frame. It is enclosed within the casing or hood 69.

The prime shaft 70 of the engine transmits power to the prime countershaft 71. The transmitting mechanism between them may be of any preferred sort. I have shown a frictional driving disk 72 on the engine shaft as the prime transmitter element.

The power is transmitted to the two traction wheels 1, 2. They are loosely journaled on spindles 9 secured to brackets 73ᵃ carried by the end parts 7, 7ᵃ of the frame.

Each traction wheel 1, 2 has a gear wheel 75 secured to it. And with these mesh pinions 76, 76. The pinions are at the outer extremities, laterally, of a counter-shaft system which comprises a central shaft section 77 and the outer sections 78, 78ª. The central shaft section 77 is mounted in a sleeve bearing 79, below, and secured to, the main longitudinal frame beams 4, 4ª. The sections 78, 78ª are mounted in bearings 80 below, and secured to, the bars 7, 7ª of the laterally expanded part of the frame.

Power is transmitted to the shaft sections 78, 78ª and 77 from a large spur gear wheel 81. This is the master driving element of a compensating gear system comprising also the two vertical bevel wheels 82, 83, and the driving pinions on spindles 85 (in hub 86 of wheel 81). The pinions mesh with both of the bevels 82, 83 and rotate bodily with the master gear 81. The driven bevel wheel 83 is connected to a rotatable friction drum 87, which is keyed to the shaft section 78, but is loosely mounted on the end of the central shaft section 77. The other compensating bevel 82 is rigidly keyed to said central section. When wheel 81 is being driven it will impart power to the two shaft sections 78 and 77 equally, but they can be rotated with variable speeds corresponding to their resistances or loads.

The shaft section 78ª is rigidly keyed to a friction drum 87ª, which has an inwardly elongated sleeve hub 88 keyed to the end of the central shaft section 77.

The master wheel 81 of the compensating gear is driven by pinion 89 on the prime countershaft 71. This countershaft is rotated from the engine shaft 70. As above stated, for some reasons I prefer to use friction transmission and mount on the countershaft 71 the slidable friction wheel 90 engaging peripherally with the driving disk 72. The sliding of the driven disk 90 toward or from the center of the driver 72 (to vary speeds or to reverse) is accomplished by a bell lever 91, actuated by a link 92 and a hand lever 93 within reach of the driver, the lever carrying a detent engaging segment rack 94.

The driving and driven disks 72 and 90 can be disconnected by a pivoted yoke 95, moved by an eccentric 96, a lever 97 and a spring 98. The lever is moved by rod 99, extending to the rear of the frame and connected to lever 100 with a detent engaging segment 101. With these devices the operator can throw the power off entirely or can press the disk 72 more or less tightly against the driven disk 90. Normally the friction elements will be held in contact with the desired pressure by the spring 98.

The drums 87, 87ª are each provided with a friction strap or band 102, and through the ends of these straps, respectively, and through sleeves 103ª, rods 103 are passed with lock nuts 104. Each rod 103 is connected to a hand lever 105 at the rear end of the frame, having a detent and rack at 105ª. Springs 106 on rods 103 act to disengage the friction straps from the drum.

All of the devices for propelling, steering, controlling and reversing the machine will now be understood. It comprises devices by which it can be caused to move rapidly or slowly as required; others by which it can be caused to follow paths that are gradually curved; and others by which it can be turned on short, quick curves, or completely reversed in a small turning space.

The driver being supported on a rearward extension of the main frame, and the front part of the structure being narrow and central, he is positioned where he can observe the action of the scrapers closely, can look over the surface of the ground from the scrapers ahead to an indefinite distance, can see when serious obstructions are approached, and can manipulate the parts or steer the machine readily and quickly according to varying requirements. Not only are the scraper adjusting levers 31, 39, 43 and 49 immediately accessible to the driver in his seat, but also the lever 105 and the hand wheel 67 are close together, and their rods or shafts 66 and 103 are compactly arranged close to the central longitudinal lines of the machine, so that he can quickly move his hands from the actuating devices (lever 105 or wheel 67) of one of the sets of steering mechanisms to those of the other set. When the levers 105 are adjusted so that the friction bands are loose from the drums 87, 87ª, the machine will move forward rectilinearly, the operator's hands being removed from the hand wheel 67. But the sleeve holding the machine to a straight line, under some circumstances, is inaccessible because of the castering capability of the wheel 3. Therefore, ordinarily, the driver has his hands upon the wheel 67, and holds the caster wheel 3 stationary for rectilineal travel. If he desires to make slight turns on curves of long radii he readily causes such turning by means of the wheel 67, the shaft 64, and the wheel-actuating steering gear 56, 59, 62 and 63. He maintains such control of the machine while advancing along straight or approximately straight lines, or on gradual curves, even though moving with considerable speed. If he should remove his hands from the wheel 67 the front wheel 3 becomes instantly loose and entirely unrestrained, and immediately commences to caster. Hence, if at any time he wishes to turn sharply and bring the entire machine around on a short curve, even to the extent of complete reversal, he drops the wheel 67, releasing his grip thereon, and immediately moves his hands, and grasps the levers 105. If he desires to turn sharply to the right he draws the right-hand lever 105 quickly backward and tightens the right-hand brake band 102, thus stopping the rotation of the right-hand drum 87, the left-hand drum rotating freely, more or less, as controlled. Thereupon the engine causes rapid rotation of the left-hand traction wheel, but the right-hand wheel remains stationary or moves slowly under frictional retardation. The front ground wheel 3 acts at such time as a free caster wheel and follows, automatically, the rapid swing of the front end of the frame.

In this way curves in the path of travel can be obtained which are much sharper than those obtainable with the caster wheel. And if desired, the machine can be quickly and completely reversed by turning half way round upon one traction wheel as a pivot. After thus turning the machine the operator takes his hands from the levers 105 and quickly grasps again the hand wheel 67, now having the mechanism again under control to cause its travel with stability along straight or approximately straight lines.

In case the operator should observe that the scraper parts are becoming excessively loaded, or are about to engage a severe obstruction, he can instantly stop the machine by lever 93 and disconnect the friction wheels 72 and 90, immediately thereafter throwing the lever 105 to apply a braking force to both drums 87, 87$^a$.

The parts are so connected and mounted in relation to each other that when the mechanism is to be turned as an entirety to the right or to the left, the scraper element is easily turned because of its position in relation to the traction wheels and the other parts. Its center, longitudinally of itself, is approximately in a vertical line intersecting the axis of the wheels and approximately in the vertical central longitudinal plane of the machine. This arrangement gives results which are materially different from those obtained with a machine of the ordinary sort in which the vertical plane of the scraper edge is entirely in front of or entirely in rear of the main ground wheels.

What I claim is:

1. In an automotive road scraper machine, the combination of a frame having a longitudinally elongated element in the central vertical longitudinal planes of the machine and an elongated transverse element extending beyond the sides of said longitudinal element, traction wheels supporting said transverse frame element, wheeled guiding means constituting an additional support for the forward end of the longitudinally elongated element of the frame, a scraper suspended beneath the frame and extending transversely thereof in an inclined direction, the ends of the scraper extending across the longitudinal vertical planes of the traction wheels with one end in advance of the traction wheel at that side of the machine and the other end in rear of the other traction wheel, and power devices on the frame connected to drive the traction wheels.

2. In a scraper mechanism, the combination of a frame having transversely aligned traction wheels at its opposite sides, a scraper extending diagonally beneath the frame from a position in rear of one wheel to a position in front of the other wheel, and comprising a plurality of sections arranged in a longitudinal series, a plurality of draw bars connected to the frame at one end and each connected to one of the scraper sections at its other end by means permitting variation of the inclination of the scraper section to the draw bar, and a plurality of vertically adjusting means each connecting one of the scraper sections to the frame.

3. In a scraper mechanism, the combination of a wheeled frame, a scraper pivotally supported beneath the frame to rock vertically, a plurality of rods connected to the scraper and extending upward therefrom, a plurality of bell crank levers fulcrumed on the frame and each having one arm loosely surrounding one of said rods, an actuating lever connected to the other arm of each bell crank, relatively stationary abutments on each rod above and below the bell crank arm, and coiled springs surrounding each rod between said abutments and the intermediate bell crank arm.

4. In a scraper mechanism, the combination of a wheeled frame, a scraper arranged beneath the frame and pivotally connected thereto, said scraper comprising a plurality of sections arranged in a longitudinal series and pivotally connected so that the end sections may be vibrated relative to an intermediate section, a rod extending upward from each end scraper section, bell cranks fulcrumed on the frame and each having one arm loosely engaging one of said rods, relatively stationary abutments on each rod, respectively, above and below the bell crank arm engaging the rod, coil springs surrounding each said rod between the bell crank arm and the abutments on the rod, a lever connected to the other arm of each bell crank, and means on the frame connected with an intermediate scraper section for elevating said intermediate section.

5. In a road scraping mechanism, the combination with a wheeled supporting frame having a relatively narrow elongated part, a relatively widely extended transverse element, and traction wheels at the outer ends of the transverse frame element, of a supporting bar on the frame inclined to the path of the machine and positioned in front of the traction wheels and in longitudinal vertical planes between said wheels, a scraper extending as an entirety on inclined lines from points in front of one traction wheel to points in rear of the other traction wheel, a plurality of vertically swinging carriers pivotally connected to said supporting bar and adjustably connected to the scraper to permit its upper edge to be adjusted to different positions horizontally relative to its lower edge, means for fastening the carriers rigidly to the scraper, and suspending devices between the scraper and frame and exerting yielding downward pressure on the scraper.

6. In a scraper mechanism, the combination of a wheeled supporting frame, a sectional scraper suspended beneath and extending in an inclined direction transversely of the frame, the right hand section of the scraper having its operative part in a vertical plane extending at an angle that intersects the vertical plane of the body of the scraper.

In testimony whereof, I affix my signature.

JOHN B. BARTHOLOMEW.